United States Patent
Meijer Drees et al.

(10) Patent No.: US 8,394,449 B2
(45) Date of Patent: Mar. 12, 2013

(54) DIFFERENTIAL COAT WEIGHT MEASUREMENT BY MEANS OF NUCLEAR OR X-RAY GAUGES

(75) Inventors: Reena Meijer Drees, New Westminister (CA); Gertjan Hofman, Vancouver (CA)

(73) Assignee: Honeywell ASCa Inc., Mississauga (CA)

( * ) Notice: Subject to any disclaimer, the term of this patent is extended or adjusted under 35 U.S.C. 154(b) by 589 days.

(21) Appl. No.: 12/621,508

(22) Filed: Nov. 19, 2009

(65) Prior Publication Data

US 2010/0159121 A1    Jun. 24, 2010

Related U.S. Application Data

(60) Provisional application No. 61/139,386, filed on Dec. 19, 2008.

(51) Int. Cl.
  *C23C 16/52* (2006.01)
  *G01T 1/167* (2006.01)
  *H04N 5/33* (2006.01)

(52) U.S. Cl. .................. 427/8; 250/393; 250/252.1

(58) Field of Classification Search ............ 427/8
  See application file for complete search history.

(56) References Cited

U.S. PATENT DOCUMENTS

| | | |
|---|---|---|
| 3,681,595 A | 8/1972 | Dahlin |
| 4,692,616 A | 9/1987 | Hegland et al. |
| 4,732,776 A | 3/1988 | Boissevain |
| 4,879,471 A | 11/1989 | Dahlquist |
| 4,920,265 A | 4/1990 | Chase et al. |
| 5,014,288 A | 5/1991 | Chase et al. |
| 5,094,535 A | 3/1992 | Dahlquist |
| 5,166,748 A | 11/1992 | Dahlquist |
| 5,338,361 A | 8/1994 | Anderson et al. |
| 5,432,353 A | 7/1995 | Goss et al. |
| 5,795,394 A | 8/1998 | Belotserkovsky et al. |
| 6,074,483 A | 6/2000 | Belotserkovsky |
| 7,399,971 B2 | 7/2008 | Hofman et al. |
| 2007/0227447 A1 | 10/2007 | Kukkurainen et al. |

OTHER PUBLICATIONS

European Search Report Apr. 19, 2012 for European Applicetion No. 09832765.3.

*Primary Examiner* — James Lin
*Assistant Examiner* — Austin Murata
(74) *Attorney, Agent, or Firm* — Casio Schmoyer & Zervas

(57) ABSTRACT

An improved differential coat weight technique employs a novel algorithm for measuring the weight of a coating material that has been deposited onto a sheet of substrate. The invention employs dual x-ray or nuclear gauges such that, even though the downstream sensor is never exposed to uncoated sheet substrate, imparting the downstream sensor with the ability to predict results that it would have yielded when measuring the uncoated sheet substrate, leads to the development of a coat weight calibration protocol from which the basis weight of the coating can be ascertained directly from measurements from the upstream and downstream sensors. No subtraction of results is required. Moreover, the two sensors do not need to be re-calibrated whenever the relative proportions of the coating and base substrate change. The technique is particularly suited for applications where the coating material and substrate are made of substances that have very different atomic numbers.

10 Claims, 1 Drawing Sheet

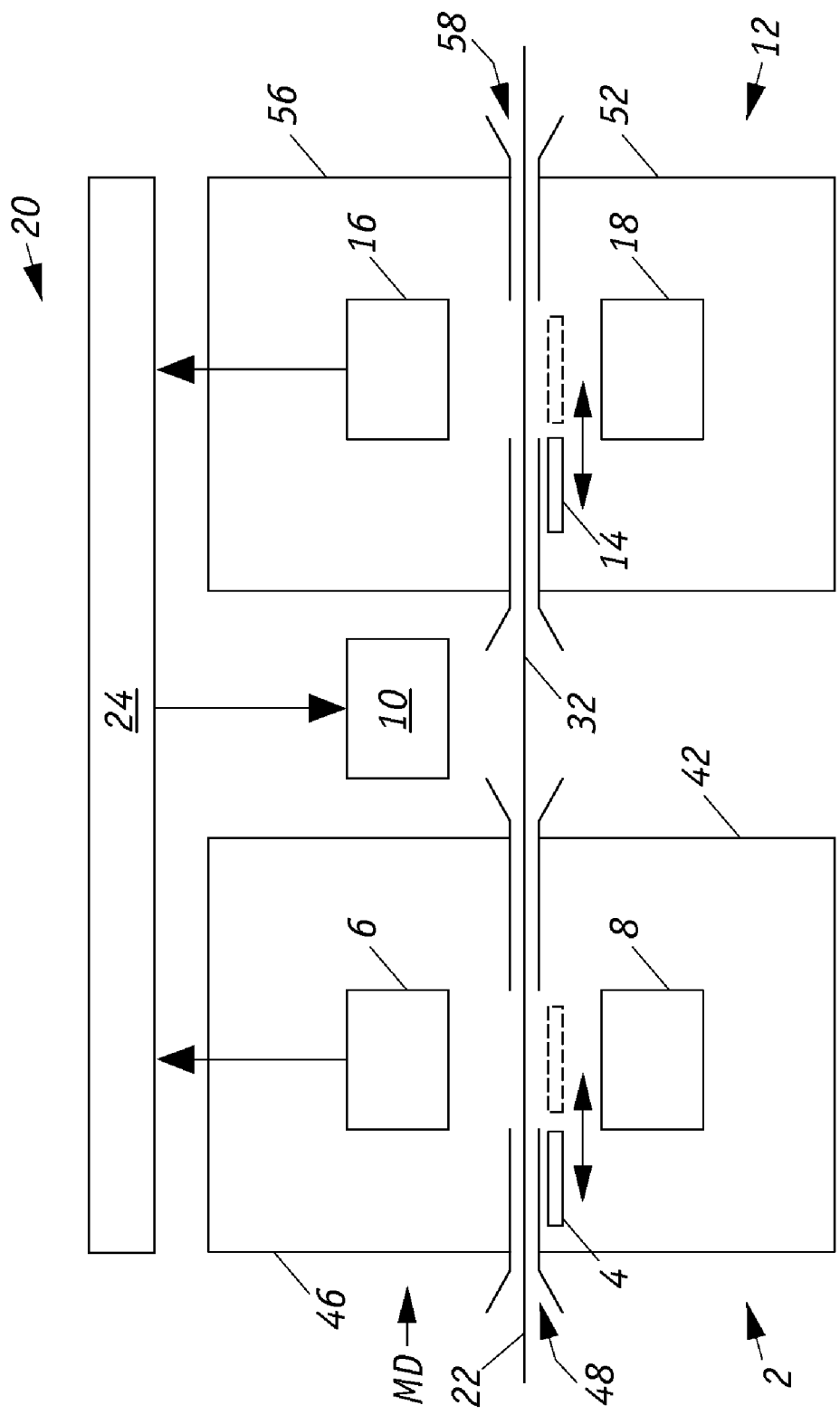

DIFFERENTIAL COAT WEIGHT MEASUREMENT BY MEANS OF NUCLEAR OR X-RAY GAUGES

REFERENCE TO RELATED APPLICATIONS

This application claims priority to U.S. Provisional Application 61/139,386 that was filed on Dec. 19, 2008.

FIELD OF THE INVENTION

The present invention relates generally to apparatuses and methods for measuring and controlling the amount of a coating applied on paper, plastic, or metal sheets and other objects, and in particular, to an apparatus and method wherein the basis weight of the coating on a moving sheet is monitored and regulated while being applied to the sheet.

It is often desirable to coat a paper, plastic or metal sheet (called a "base sheet") with any of a wide variety of materials. Indeed, with respect to paper, an increasing proportion of the world's paper production is devoted to coated paper and coated paperboard. Uniformity of coating "basis weight" (i.e., the mass of the coating material on a unit of surface area of the sheet) is often necessary or desirable for various reasons. For example, the printability of glossy paper may be improved by the uniform application of a gloss coating. Also, gloss coatings may contain relatively expensive materials, such as latex and/or $TiO_2$. Accordingly, the manufacturer will want to precisely monitor the coating and control the application of such coating to apply as uniform a coating as possible. In some cases, the evenness of the coating must be controlled within a fraction of a $gram/m^2$. Because of the lateral extent of the sheet in the cross-direction (10 feet or more) and the requirement of accurately and evenly applying a coating to such sheets, rather complex coaters have been designed and manufactured.

Numerous schemes have been attempted to measure and control the amount of coating applied to a sheet. One of the most difficult aspects of the coating control process is obtaining an accurate measurement of the amount of coating applied to a sheet, particularly when the coating amounts must be measured to an accuracy of fractions of a $gram/m^2$.

Differential coat weight is traditionally measured using two nuclear or x-ray sensors, an upstream sensor that measures the base sheet and a downstream sensor that measures the coated product. The two sensors are typically run in the "same spot" mode, that is, the scanning speed is adjusted based on the process speed so that the two sensors measure the same spot on the sheet before and after the costing process. The two sensors are calibrated on a very uniform plastic such as polyester. The calibration includes a correction factor that takes into account the difference in sensor response between the polyester and the product (i.e., base sheet or coated material). The coat weight is then calculated as the difference between the two sensor readings.

This method works adequately when the base sheet and coating material are made from substances that have similar atomic weights; however, the single calibration does not work well when the base sheet and coating material are made of substances that have vastly different atomic weights. For example, the technique does not yield accurate coat weight measurements for applications involving organic materials that are combined with metals, such as in the manufacture of sandpaper, aluminum coated paperboard, and glass mat with resins. In operation, the correction factor in the second (or downstream) gauge depends strongly on the exact proportion of metals to organic material and typically, for each different portion, a new correction factor, that is, a new calibration, is required. Grade changes are then problematic if they are done gradually, and the calibration becomes a major challenge when a process entails running different grades of material.

SUMMARY OF THE INVENTION

The present invention is based in part on the recognition that, even though the second or downstream sensor is never exposed to uncoated sheet substrate, imparting the second sensor with the ability to predict results that it would have yielded when measuring the uncoated sheet substrate, leads to the development of a coat weight calibration protocol from which the basis weight of the coating can be ascertained directly from measurements from the first (or upstream) and second (or downstream) sensors. No subtraction of results is required. Moreover, the two sensors do not need to be re-calibrated whenever the relative proportions of the coating and base substrate change. The ability of the second sensor to make the measurement predictions is achieved by constructing a transformation curve between the so-called "clean" calibration curves for the first and second sensors. Finally, a calibration curve that directly yields the basis weight of the coating that is on the sheet substrate, based on measurements from the first sensor and the second sensor, is created and implemented.

The invention obviates the need for a different correction factor for every grade or different proportion of metal to organic material. A single calibration can be used to measure the basis weight of coated material that is deposited on a substrate even when there are large variations in the ratio of metal to organic materials. With the improved differential coat weight sensors, management of calibration constants is no longer an issue and the sensors remain accurate and reliable through grade changes. Moreover, existing differential coat weight sensors can be readily programmed to implement the novel protocols so no new hardware required.

BRIEF DESCRIPTION OF THE DRAWINGS

FIG. 1 is a schematic illustration of a coating apparatus employing dual basis weight sensors.

DESCRIPTION PREFERRED EMBODIMENTS OF THE INVENTION

As shown in FIG. 1, a coating apparatus 20 employs a deposition device or coater 10 to apply a coating material onto a continuous moving sheet or web 22 that is moving in the machine direction (MD) to form a coated moving web 32. The coating apparatus 20 includes a first sensor 2 that is positioned upstream from coater 10 and a second sensor 12 that is positioned downstream from coater 10. Sensors 2 and 12 can each be incorporated into an on-line dual head scanning system for scanning each sensor along a cross direction of the moving web as further disclosed in U.S. Pat. No. 4,879,471 to Dahlquist, U.S. Pat. No. 5,094,535 to Dahlquist et al., and U.S. Pat. No. 5,166,748 to Dahlquist, all of which are incorporated herein by reference. The dual head design has an upper head that is positioned above the web and a lower head that is positioned below the web. For sensor 2, the upper head houses the radiation detector and the lower head houses the radiation source. The dual heads move synchronously back-and-forth in the cross direction, which is transverse to the machine direction, as sensor 2 measures uncoated web 22. A second dual head scanning system is used for sensor 12 that is scanned across coated web 32. In this fashion, differential coat weight measurements are obtained in the cross direction as well.

Sensor 2 has gauging head 42 that houses a radiation source 8 that emits radiation that is directed along a radiation path toward web 22. The radiation can be of the beta or x-ray type. A radiation detector 6 that is housed in gauge head 46 senses the intensity of radiation that is transmitted through web 22. Uncoated web 22 travels through gap 48 that is between gauging heads 42 and 46. In other words, the radiation detector senses the amount of radiation absorbed by the web material, which gives a direct indication of the basis weight of the web material. This is in substantial accordance with Beer's law which is expressed as follows: $I=I_o e^{-\mu x}$ where e is the natural log base, $\mu$ is the mass absorption coefficient which is a function of the radiation energy from the source and of the type of material being measured, x is the weight per unit are of the material being measured in terms of milligrams per square centimeter, $I_o$ is the intensity of radiation reaching the radiation detector in the absence of the absorbing material, and I is the intensity of radiation reaching the detector in the presence of the radiation absorbing the material.

Standard means 4 having a predetermined and stable basis weight is provided which may be selectively interposed in the radiation path between source 8 and detector 6. The standard means 4 can include a polyester (MYLAR from DuPont) disc of a predetermined and stable basis weight which is secured to a frame that is pivoted for rotation on a shaft which is driven through a universal joint by a rotary solenoid unit.

Similarly, sensor 12 includes gauge head 52 that houses a radiation source 18 that emits radiation that is directed along a radiation path toward coated web 32. A radiation detector 16 that is housed in gauge head 56 senses the intensity of the radiation, which is transmitted through coated web 32. The coated web 32 travels through gap 58 that is between gauging heads 52 and 56. Standard means 14 is provided which may be selectively interposed in the radiation path between source 18 and detector 16. While the radiation for sensor 12 also can be of the beta or x-ray type, it is necessary that both sensors 2 and 12 be of the same type, that is, they either are both beta or both x-ray devices. Suitable x-ray sensors include the 4217 model series from Honeywell International, Inc. and suitable beta sensors include the 4203 model series of nuclear sensors also from Honeywell.

Process controller 24 to calculate the basis weight of the coated material on coated web 32 receives signals from sensors 2 and 12. Should the basis weight deviate from a desired level, appropriate signals are sent to coater 10 to adjust the amount of coating material that is metered onto web 22.

Sensors 2 and 12 are individually standardized for measuring the basis weight per unit area of the sheet material by a procedure that is described in U.S. Pat. No. 4,692,616 to Hegland et al. that is incorporated herein by reference. With respect to sensor 2, the procedure entails first constructing two calibration curves each showing the basis weight on a first axis versus a function of the transmission ratio on a second axis. The transmission ratio is the ratio of two intensities of received radiation with different materials in gap 48. The first or "clean" calibration curve is constructed without simulated dirt while the second or "dirty" calibration curve is constructed with simulated dirt. Dirt can be simulated by placing a material in the radiation path or alternatively by changing the temperature of the air column of the path or by changing the geometry.

Next, a standardization curve is constructed by plotting the displacement of one calibration curve relative to the other. Sensor 2 is then operated to measure the weight per unit area of the sheet material by determining a measured transmission ratio. Finally, sensor 2 is standardized during its operation; this step includes determining a correction factor that is based upon the value of the standardization curve at a point corresponding to the measured transmission ratio. The correction factor takes into account the difference in sensor response between the polyester material of the standard 4 or 14 and the product, that is, base sheet or coated material.

Sensor 12 is standardized in the same manner as sensor 2 and thereafter sensors 2 and 12 can be employed to measure the basis weight of an uncoated (or base sheet) and the coated sheet, respectively. In this fashion, the differential coat weight can be really determined. It has been demonstrated that this technique yields adequate results only when the base sheet and coating materials are made of substances that have similar atomic weights. When the base sheet and coating materials are composed of substances that have vastly different atomic weights, the calibration does not work well. The reason is that the correction factor of the second sensor, that measures the coated sheet, depends strongly on the exact proportion of metal to organic material. This means that for each different proportion, a new correction factor, i.e., calibration, is required.

The present invention solves this problem by developing an algorithm that allows the basis weight of the coated material to be calculated directly from measurements of the first and second sensors. This achieved by first constructing a transformation curve based on the "clean" calibration curves for the first and second sensors, as described above, wherein the transformation curve predicts the basis weight measurements that the second sensor would have yielded when measuring the uncoated sheet substrate. A preferred method of generating a transformation curve is to measure the sensor responses to a set of samples that span the weight range of coated and uncoated product. (The set of samples is the same for each gauge.) The transformation curve is determined by fitting the responses of the first (or upstream) sensor to the responses of the second (or downstream) sensor. Thereafter, a coat weight calibration curve based on measurements from the first and the second sensors and that yields the basis weight of the coating directly, can be constructed. Using a differential coat weight measuring device with two x-ray sensors (a first or upstream sensor and a second or downstream) as an example, operation of each x-ray sensor can be analyzed on the basis of the absorption equation:

$R_c = \exp(-\mu W_c)$ where the sensor voltage response is $R_c$, the basis weight of the coated sample is $W_c$, and the (average) x-ray absorption coefficient is $\mu$.

For the coated material, $W_c = W_0 + W_1$ so we may state:

$$R_c = \exp(-\mu_0 W_0 - \mu_1 W_1)$$

$$R_c = \exp(-\mu_0 W_0)\exp(-\mu_1 W_1)$$

$$R_c/R_0 = \exp(-\mu_1 W_1)$$

where we have substituted for the measurement obtained on uncoated material, $R_0 = \exp(-\mu W_0)$. This measurement will be performed on the first sensor. Using the transformation curve, we predict what the second gauge would have measured at this spot. We then use the reading from the second gauge (on coated material), $R_c$ and solve for the coat weight, $W_1$ to obtain $-\mu_1 \ln R_c/R_0$. Standard practice is to fit for the coat weight by expanding this equation into a polynomial series:

$$W_1 = \text{const} + A \times ln(R_c/R_0) + B \times ln(R_c/R_0)^2 + C \times ln(R_c/R_0)^3 + \ldots \quad [1]$$

Equation [1] thus can be applied to measure the weight of the coated material directly from measurements of the first and second sensors. The invention is particularly suited for measuring the coat weight where the base sheet and coating material are made of substances that have are vastly different in atomic weights. For instance, in applications involving organic materials combined with metals such as sandpaper, aluminum or other metal-coated board, glass mat with resins, plastic-coated metal, and the like.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of calibrating a coating sensor device for measuring the amount of coating material on a coated sheet substrate, such coating sensor device having (i) a first basis weight gauge that includes a first radiation source and first radiation detector with a first gap therebetween for directing a first radiation along a first path towards a sheet substrate and for detecting the amount of first radiation transmitted through the sheet substrate wherein the transmitted first radiation being a measure of the basis weight of the sheet substrate and (ii) a second basis weight gauge that includes a second radiation source and second radiation detector with a second gap therebetween for directing a second radiation along a second path towards the coated sheet substrate after the sheet substrate had been coated and for detecting the amount of second radiation transmitted through the coated sheet substrate wherein the transmitted second radiation being a measure of the basis weight of the coated sheet substrate, wherein the amount of coating material on the coated sheet substrate is determined by measurements from the first and second basis weight gauges, the method comprising the steps of:
    (a) constructing a first calibration curve for the first basis weight gauge showing basis weight versus a function of transmission ratio, the first calibration curve being constructed without simulated dirt;
    (b) constructing as second calibration curve for the first basis weight gauge showing basis weight versus a function of transmission ratio, the second calibration curve being constructed with simulated dirt;
    (c) constructing a third calibration curve for the second basis weight gauge showing basis weight versus a function of transmission ratio, the third calibration curve being constructed without simulated dirt;
    (d) constructing a fourth calibration curve for the second basis weight gauge showing basis weight versus a function of transmission ratio, the fourth calibration curve being constructed with simulated dirt;
    (e) constructing a transformation curve based on the first calibration curve and the third calibration wherein the transformation curve predicts the basis weight measurement of the uncoated sheet which would be yielded by the second basis weight gauge if performing an actual measurement of the uncoated sheet; and
    (f) constructing a coat weight calibration curve that yields the basis weight of the coated material that is on the sheet substrate based on measurements from the first gauge and the second gauge.

2. The method of claim 1 wherein the first and second basis weight gauges are both x-ray based sensors or are both nuclear-based sensors.

3. The method of claim 1 wherein the coating material comprises metal and the substrate comprises paper or plastic.

4. The method of claim 1 wherein the coating material comprises plastic and the substrate comprises metal.

5. The method of claim 1 wherein the step (f) the calibration curves yields the basis weight of the coated material without the need to subtract results from measurements from the first and second basis weight gauges.

6. A method of controlling the formation of a coated sheet substrate that is prepared by depositing a coating material on a coating apparatus that includes a continuous sheet of substrate that is moving in a downstream direction (MD) along a path wherein the coating material is deposited by a metering device that applies an amount of coating material on the continuous sheet of substrate, the method comprising the steps of
    (a) positioning a first basis weight gauge, at a location that is upstream from the metering device wherein the first basis weight gauge that includes a first radiation source and first radiation detector with a first gap therebetween for directing a first radiation along a first path towards the sheet substrate and for detecting the amount of first radiation transmitted through the sheet substrate and generating a first signal that corresponds to the first radiation transmitted, wherein the transmitted first radiation being a measure of the basis weight of the sheet substrate;
    (b) positioning a second basis weight gauge, at a location that is downstream from the metering device, that includes a second radiation source and second radiation detector with a second gap therebetween for directing a second radiation along a second path towards the coated sheet substrate after the sheet substrate had been coated and for detecting the amount of first radiation transmitted through the coated sheet substrate and generating a second signal that corresponds to the second radiation transmitted wherein the transmitted second radiation being a measure of the basis weight of the coated sheet substrate;
    (c) constructing a first calibration curve for the first basis weight gauge showing basis weight versus a function of transmission ratio, the first calibration curve being constructed without simulated dirt;
    (d) constructing a second calibration curve for the first basis weight gauge showing basis weight versus a function of transmission ratio, the second calibration curve being constructed with simulated dirt;
    (e) constructing a third calibration curve for the second basis weight gauge showing basis weight versus a function of transmission ratio, the third calibration curve being constructed without simulated dirt;
    (f) constructing a fourth calibration curve for the second basis weight gauge showing basis weight versus a function of transmission ratio, the fourth calibration curve being constructed with simulated dirt;
    (g) constructing a transformation curve based on the first calibration curve and the third calibration wherein the transformation curve predicts the basis weight measurement of the uncoated sheet which would be yielded by the second basis weight gauge if performing an actual measurement of the uncoated sheet;
    (h) constructing a coat weight calibration curve that yields the basis weight of the coated material that is on the sheet substrate based on measurements from the first gauge and the second gauge;

(i) operating the coating apparatus and measuring the amount of coating material on the coated sheet substrate; and (j) adjusting the metering device to regulate the amount of coating material that is deposited onto the sheet substrate.

7. The method of claim 6 wherein the first and second basis weight gauges are both x-ray based sensors or are both nuclear-based sensors.

8. The method of claim 6 wherein the coating material comprises metal and the substrate comprises paper or plastic.

9. The method of claim 6 wherein the coating material comprises plastic and the substrate comprises metal.

10. The method of claim 6 wherein the step (h) the calibration curves yields the basis weight of the coated material without the need to subtract results from measurements from the first and second basis weight gauges.

* * * * *